United States Patent
Choi et al.

(10) Patent No.: US 9,891,692 B2
(45) Date of Patent: Feb. 13, 2018

(54) APPARATUS AND METHOD OF CONTROLLING POWER CONSUMPTION OF GRAPHIC PROCESSING UNIT (GPU) RESOURCES

(71) Applicant: Samsung Electronics Co., Ltd., Suwon-si (KR)

(72) Inventors: Yoonseo Choi, Seoul (KR); Choonki Jang, Anyang-si (KR); Haewoo Park, Seoul (KR); Hyeongseok Yu, Seoul (KR); Donghoon Yoo, Suwon-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 58 days.

(21) Appl. No.: 14/738,118

(22) Filed: Jun. 12, 2015

(65) Prior Publication Data

US 2016/0062445 A1    Mar. 3, 2016

(30) Foreign Application Priority Data

Aug. 28, 2014 (KR) .................. 10-2014-0113355

(51) Int. Cl.
| | | |
|---|---|---|
| *G06F 1/00* | (2006.01) | |
| *G06F 1/32* | (2006.01) | |
| *G06F 9/46* | (2006.01) | |
| *G06F 9/38* | (2006.01) | |

(52) U.S. Cl.
CPC .............. *G06F 1/325* (2013.01); *G06F 1/329* (2013.01); *G06F 9/3836* (2013.01); *G06F 9/46* (2013.01); *Y02B 60/144* (2013.01)

(58) Field of Classification Search
CPC ...... G06F 1/325; G06F 1/329; G06F 11/0784; G06F 9/3836; G06F 9/46
USPC ......... 712/225, 233; 713/300, 320; 717/125, 717/128, 124, 170, 108, 154; 707/718; 716/113; 718/102

See application file for complete search history.

(56) References Cited

U.S. PATENT DOCUMENTS

| | | |
|---|---|---|
| 7,185,215 B2 | 2/2007 | Cook et al. |
| 8,458,497 B2 | 6/2013 | Du et al. |
| 8,610,732 B2 | 12/2013 | Jacoby |
| 8,966,492 B2 * | 2/2015 | Kikuchi ................ H04L 41/147 370/328 |

(Continued)

FOREIGN PATENT DOCUMENTS

| | | |
|---|---|---|
| JP | 4721975 B2 | 4/2011 |
| JP | 2013-109442 A | 6/2013 |
| KR | 10-2014-0010671 A | 1/2014 |

*Primary Examiner* — Aurel Prifti
(74) *Attorney, Agent, or Firm* — Harness, Dickey & Pierce, P.L.C.

(57) ABSTRACT

A power consumption control apparatus includes a resource selecting unit configured to select resources, whose power consumption levels are to be determined, from among resources of a graphic processing unit (GPU), a resource use information acquiring unit configured to determine whether the selected resources are used from a code block which is all or part of a program executed using the GPU, and a power consumption controlling unit configured to determine a power consumption level of the selected resource based on a determination result of the resource information acquiring unit and to control the power consumption level of the selected resources based on a determined power consumption level of the selected resources.

18 Claims, 6 Drawing Sheets

(56) References Cited

U.S. PATENT DOCUMENTS

| | | | |
|---|---|---|---|
| 2005/0231514 A1* | 10/2005 | Harper | G06T 1/20 345/501 |
| 2007/0074011 A1* | 3/2007 | Borkar | G06F 1/3203 712/227 |
| 2007/0294663 A1* | 12/2007 | McGuire | G06F 8/45 717/108 |
| 2009/0049312 A1* | 2/2009 | Min | G06F 1/3228 713/300 |
| 2009/0210649 A1* | 8/2009 | Wan | G06F 9/30087 711/170 |
| 2009/0254767 A1* | 10/2009 | Ford | G06F 1/3203 713/320 |
| 2009/0265692 A1* | 10/2009 | Godefroid | G06F 11/3688 717/128 |
| 2011/0320434 A1* | 12/2011 | Carston | G06F 17/30463 707/718 |
| 2012/0159452 A1* | 6/2012 | DeLine | G06F 8/34 717/125 |
| 2012/0284681 A1* | 11/2012 | Makino | G06F 17/5045 716/113 |
| 2013/0106881 A1 | 5/2013 | Hendry et al. | |
| 2013/0326524 A1* | 12/2013 | Houston | G06F 9/522 718/102 |
| 2014/0059524 A1* | 2/2014 | Kee | G06F 8/34 717/154 |
| 2014/0096112 A1* | 4/2014 | DeLine | G06F 8/75 717/125 |
| 2014/0365752 A1* | 12/2014 | Howes | G06F 9/3851 712/233 |
| 2015/0243285 A1* | 8/2015 | Lane | G10L 15/34 704/256.1 |
| 2015/0268963 A1* | 9/2015 | Etsion | G06F 9/3869 712/225 |
| 2015/0324707 A1* | 11/2015 | Zhou | G06F 11/3409 717/124 |
| 2015/0355996 A1* | 12/2015 | Smith | G06F 11/3636 717/128 |
| 2016/0119572 A1* | 4/2016 | Slupik | H04N 19/156 348/445 |
| 2016/0119626 A1* | 4/2016 | Slupik | H04N 7/18 375/240.02 |

\* cited by examiner

APPARATUS AND METHOD OF CONTROLLING POWER CONSUMPTION OF GRAPHIC PROCESSING UNIT (GPU) RESOURCES

CROSS-REFERENCE TO RELATED APPLICATION

This application claims the benefit under 35 USC 119(a) of Korean Patent Application No. 10-2014-0113355, filed on Aug. 28, 2014, in the Korean Intellectual Property Office, the entire disclosure of which is incorporated herein by reference for all purposes.

BACKGROUND

1. Field

The following description relates to an apparatus and method of controlling power consumption, and more particularly, to an apparatus and method of effectively controlling power consumption of graphic processing unit (GPU) resources.

2. Description of the Related Art

A graphic processing unit (GPU) is a three-dimensional rendering device that is essential to various apparatuses, such as a desktop computer, a laptop computer, a mobile phone, and a media player. In order to improve a user's visual experience, it is important to improve the function and performance of the GPU and reduce the power consumption of the GPU.

Most applications using the GPU, such as a game, a user experience (UX), and a computer-added design (CAD), need a graphics pipeline function, and recent applications using only a computing function also utilizes the GPU. Examples thereof are applications based on programming architecture, such as CUDA or OpenCL. Such applications perform operations in parallel.

When the applications using only the computing function are executed, pipeline functions, except for several resources such as a core processor of a CPU and a texture unit for processing image data, are not used. Accordingly, unused resources may be operated at a low power level.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, there is provided a power consumption control apparatus and method which are capable of reducing power consumption levels of graphic processing unit (GPU) resources.

In another general aspect, there is provided a non-transitory computer-readable recording media having embodied thereon programs for executing the methods.

Additional aspects will be set forth in part in the description which follows and, in part, will be apparent from the description, or may be learned by practice of the presented embodiments.

According to an aspect of an exemplary embodiment, a power consumption control apparatus includes: a resource selecting unit configured to select resources, from among resources of a graphic processing unit (GPU); a resource use information acquiring unit configured to determine whether the selected resources are used from a code block executed using the GPU; and a power consumption controlling unit configured to determine a power consumption level of the selected resources based on a determination result of the resource information acquiring unit and to control the power consumption level of the selected resources based on the determined power consumption level of the selected resources.

The resource use information acquiring unit is further configured to extract a command included in the code block, to determine a resource executing an extracted command among the selected resources from the command, and to determine a determined resource as a resource used by the code block.

The power consumption controlling unit reduces a power consumption level while the GPU processes the code block with respect to an unused resource among the selected resources, based on the determination result.

The power consumption controlling unit reduces the power consumption level when a time needed by the GPU to processes the code block is greater than a threshold value.

A program may include a plurality of code blocks, the resource use information acquiring unit further includes a resource use information merging unit that merges information indicating whether the selected resource acquired corresponding to the plurality of code blocks is used, and the power consumption controlling unit determines a power consumption level of the selected resource based on a merging result and controls a power consumption level of the selected resource while the GPU processes the plurality of code blocks based on the determined power consumption level.

When one or more of the plurality of code blocks use the selected resources, the resource use information merging unit determines that all the plurality of code blocks use the selected resource, and when all the plurality of code blocks do not use the selected resources, the resource use information merging unit determines that all the code blocks do not use the selected resources and merges resource use information thereof.

The power consumption controlling unit reduces a power consumption level while the GPU processes the plurality of code blocks with respect to an unused resource among the selected resources, based on the merging result.

The power consumption controlling unit reduces the power consumption level when a time needed by the GPU to processes the plurality of code blocks is greater than a threshold value.

The power consumption control apparatus may further include a processing sequence reordering unit that reorders a processing sequence in which the GPU processes the plurality of code blocks when the program includes a plurality of code blocks, wherein the processing sequence reordering unit reorders the processing sequence so as to reduce a sum of changes in the power consumption level of the selected resources while the GPU processes the plurality of code blocks, and the sum of the changes in the power consumption level of the selected resources is determined based a number of changes of use/non-use of the selected resources by comparing information about the use/non-use of the selected resources acquired corresponding to the plurality of code blocks in a predetermined processing sequence.

According to an aspect of another exemplary embodiment, a power consumption control method includes: selecting resources, from among resources of a GPU; determining whether the selected resources are used from a code block executed using the GPU and to output a determination result thereof and determining a power consumption level of the selected resources based on a determination result and controlling the power consumption level of the selected resources based on a determined power consumption level of the selected resources.

The determining of whether the selected resources are used includes: extracting a command included in the code block; determining a resource executing an extracted command among the selected resources from the command; and determining a determined resource as a resource used by the code block.

The controlling of the power consumption level of the selected resources includes reducing a power consumption level while the GPU processes the code block with respect to an unused resource among the selected resources, based on the determination result.

The controlling of the power consumption level of the selected resources includes reducing the power consumption level when a time needed by the GPU to processes the code block is greater than a threshold value.

A program may include a plurality of code blocks, the determining of whether the selected resources are used may further include merging information indicating whether the selected resources acquired corresponding to the plurality of code blocks are used, and the controlling of the power consumption level of the selected resources includes determining a power consumption level of the selected resources based on a merging result and controlling a power consumption level of the selected resources while the GPU processes the plurality of code blocks based on a determined power consumption level.

When one or more of the plurality of code blocks use the selected resource, the merging of the information includes determining that all the plurality of code blocks use the selected resources, and when all the plurality of code blocks do not use the selected resources, the merging of the information includes determining that all the plurality of code blocks do not use the selected resource.

The controlling of the power consumption level of the selected resources includes reducing a power consumption level while the GPU processes the plurality of code blocks with respect to an unused resource among the selected resources, based on the merging result.

The controlling of the power consumption level of the selected resources includes reducing the power consumption level when a time needed by the GPU to processes the plurality of code blocks is greater than a threshold value.

The power consumption control method may further include, when the program includes a plurality of code blocks, reordering a processing sequence in which the GPU processes the plurality of code blocks, wherein the reordering of the processing sequence includes reordering the processing sequence so as to reduce a sum of changes in the power consumption level of the selected resources while the GPU processes the plurality of code blocks, and the sum of the changes in the power consumption level of the selected resources is determined based a number of changes of use/non-use of the selected resources by comparing information about the use/non-use of the selected resources acquired corresponding to the plurality of code blocks in a predetermined processing sequence.

According to an aspect of another exemplary embodiment, there is provided a non-transitory computer-readable recording medium having embodied thereon a program for executing the power consumption control method according to the exemplary embodiments.

BRIEF DESCRIPTION OF THE DRAWINGS

These and/or other aspects will become apparent and more readily appreciated from the following description of the exemplary embodiments, taken in conjunction with the accompanying drawings in which.

DETAILED DESCRIPTION

The following detailed description is provided to assist the reader in gaining a comprehensive understanding of the methods, apparatuses, and/or systems described herein. However, various changes, modifications, and equivalents of the systems, apparatuses and/or methods described herein will be apparent to one of ordinary skill in the art. The progression of processing steps and/or operations described is an example; however, the sequence of and/or operations is not limited to that set forth herein and may be changed as is known in the art, with the exception of steps and/or operations necessarily occurring in a certain order. Also, descriptions of functions and constructions that are well known to one of ordinary skill in the art may be omitted for increased clarity and conciseness.

The features described herein may be embodied in different forms, and are not to be construed as being limited to the examples described herein. Rather, the examples described herein have been provided so that this disclosure will be thorough and complete, and will convey the full scope of the disclosure to one of ordinary skill in the art.

Reference will now be made in detail to exemplary embodiments, examples of which are illustrated in the accompanying drawings, wherein like reference numerals refer to like elements throughout. In this regard, the present exemplary embodiments may have different forms and should not be construed as being limited to the descriptions set forth herein.

Figure 1:
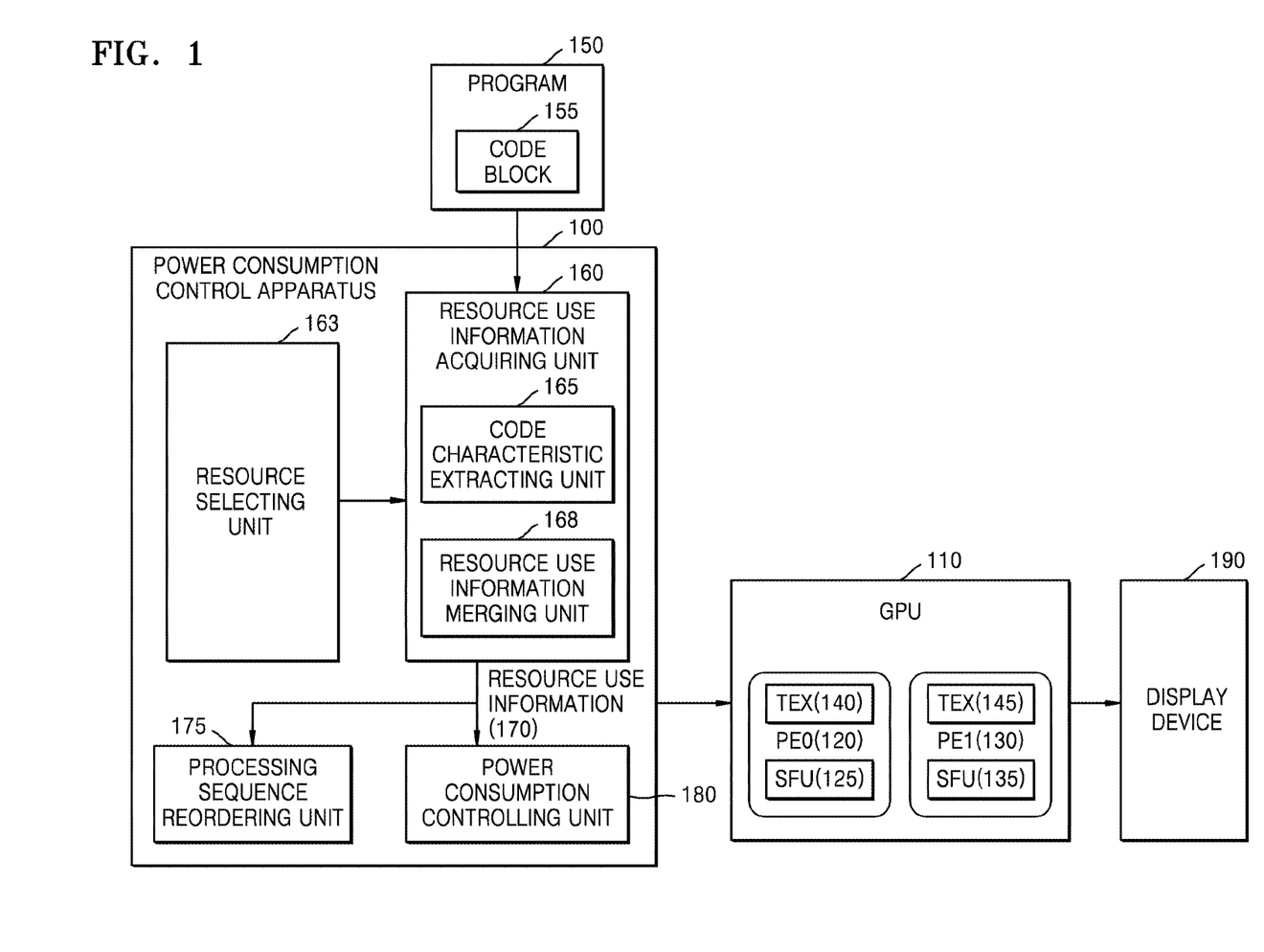
FIG. 1 is a diagram illustrating an example of a configuration in which a power consumption control apparatus controls power consumption levels of graphic processing unit (GPU) resources.

FIG. 1 is a diagram illustrating an example of a configuration in which a power consumption control apparatus controls power consumption levels of graphic processing unit (GPU) resources.

Referring to FIG. 1, the power consumption control apparatus 100 includes a resource selecting unit 163, a resource use information acquiring unit 160, a code characteristic extracting unit 165, a resource use information merging unit 168, a resource use information 170, a processing sequence reordering unit 175, a power consumption controlling unit 180.

A GPU 110 refers to a processor capable of accelerating and processing operations required for displaying a three-dimensional (3D) graphic. Processing elements 120 and 130 are units that exist within the GPU 110 so as to process a series of operations.

The GPU 110 displays a 3D graphic by using various resources. A texture unit 140 is a resource that applies a material or a texture to an image to be displayed, and special function units (SFUs) 125, 135 are resources that processes complicated operations, such as a square root, a reciprocal, or a trigonometric function. In addition, the GPU 110 includes an arithmetic logic unit (ALU) that processes a floating point operation, an integer operation, a comparison operation, and a data transfer, a geometry unit that calculates a position of an object and a direction of a light source, and a raster unit that projects 3D data on a two-dimensional (2D) screen.

For convenience of description, it is assumed that the GPU 110 includes two processing elements PE0 (120) and PE1 (130). The processing elements PE0 (120) and PE1 (130) include SFUs 125 and 135 and texture units 140 and 145, respectively. In the GPU 110, the two processing elements PE0 (120) and PE1 (130) share a single texture unit.

For convenience of explanation, only the texture unit and the SFU are illustrated, but it is obvious that the GPU 110 includes or exclude the resources, such as the ALU, the geometry unit, and the raster unit, according to the type and structural characteristic thereof.

The display device 190 displays a rendering image output from the GPU 110. The display device 190 includes a liquid crystal display (LCD), a cathode ray tube (CRT), a plasma display panel (PDP), and the like, but is not limited thereto.

The resource selecting unit 163 selects a predetermined resource having high importance or interest for reduction of power consumption among the resources of the GPU 110. The resource selecting unit 163 selects the SFUs 125 and 135 and the texture units 140 and 145 among one or more resources constituting the GPU 110 and determine a power consumption level.

A program 150 may correspond to a set of commands that are expressed with a series of methods and sequences performed using the GPU 110. The program 150 may include applications for rendering a 3D graphic by using the GPU 110, such as a game or a CAD program using a 3D display.

A code block 155 may correspond to all or part of the program 150. The code block 155 includes a high level programming language, such as C language and Java, or a low level programming language, such as a machine language, but is not limited thereto.

The code block 155 includes a machine language obtained by compiling a high level programming language. The unit and length of the code block 155 are variable. Accordingly, the code block 155 may be a function constituting the program 150, a file constituting the program 150, and one or more code lines, but is not limited thereto. It is obvious that a single program 150 may include one or more code blocks 155.

The resource use information acquiring unit 160 acquires, from the program 150, resource use information including whether the program 150 uses a resource selected by the resource selecting unit 163. The resource use information acquiring unit 160 acquires resource use information from the code block 155 by determining whether a resource selected by the resource selecting unit 163 is used. The resource use information acquiring unit 160 includes the code characteristic extracting unit 165 and the resource use information merging unit 168.

The code characteristic extracting unit 165 extracts a characteristic of a code included in the code block 155. The characteristic of the code may correspond to information capable of being acquired from the code block 155 and information referenced when determining a power consumption level of the resource selected by the resource selecting unit 163. The characteristic of the code may correspond to a command included in the code block 155. That is, the code characteristic extracting unit 165 extracts one selected from among a type of a command, a type of data, a use frequency of a command, and meta information of a code.

For example, if a SAMPLE command is included in the code block 155, the code characteristic extracting unit 165 expects that the GPU 110 will process the code block 155 by using the texture unit 140 or 145, based on a determination result. If a SAMPLE command is not included in the code block 155, the code characteristic extracting unit 165 expects that the GPU 110 will not use the texture unit 140 or 145 when processing the code block 155.

Similarly, if an ADD command is included in the code block 155, the code characteristic extracting unit 165 expects that the ALU included in the GPU 110 will be used. If an SQRT command is included, the code characteristic extracting unit 165 expects that the SFU 125 or 135 will be used.

According to an exemplary embodiment, the code characteristic extracting unit 165 analyzes meta information and a type of data to be processed in the code block 155 and determines a resource expected to be used when the GPU 110 processes the code block 155. For example, if a function included in the code block 155 uses image data as an argument, the code characteristic extracting unit 165 expects that the GPU 110 will use the texture unit 140 when processing the code block 155.

The code characteristic extracting unit 165 analyzes a use frequency of a predetermined command. For example, the code characteristic extracting unit 165 determines whether the frequency of the SAMPLE command included in the code block 155 is higher than a threshold value and extracts information based on the determination result.

The power consumption control apparatus 100 acquires resource use information 170 capable of determining a power consumption level of a resource selected by the resource selecting unit 163, based on a characteristic extracted from the code block 155 by the code characteristic extracting unit 165.

According to an exemplary embodiment, the power consumption control apparatus 100 generates information included in the resource use information 170 indicating whether the code block 155 uses the resource selected by the resource selecting unit 163. The power consumption control apparatus 100 determines a resource executing a relevant command among resources selected by the resource selecting unit 163 from the command included in the code block 155, and determines the determined resource as a resource used by the code block 155.

That is, when the code characteristic extracting unit 165 determines that the code block 155 includes the "sample" command, it is determined that the GPU uses the texture unit 140 when processing the code block 155. Therefore, the power consumption control apparatus 100 generates information included in the resource use information 170 indicating that the code block 155 uses the texture unit 140. The resource use information 170 will be described below in detail with reference to FIG. 2.

The resource use information 170 is acquired from the single code block, but the resource use information merging unit 168 may acquire new resource use information generated by merging a plurality of resource use information. The merged resource use information includes information indicating whether a plurality of code blocks use a resource selected by the resource selecting unit 163. The merging of the resource use information in the power consumption control apparatus 100 will be described below with reference to FIG. 4.

The resource use information 170 is output to the processing sequence reordering unit 175. Using the resource use information 170, the processing sequence reordering unit 175 reorders a processing sequence of the code blocks so as to reduce the sum of changes in the power consumption levels of the resources selected by the resource selecting unit 163 while the GPU 110 processes the plurality of code blocks 155. A method of reordering a processing sequence of code blocks in the power consumption control apparatus 100 will be described below with reference to FIG. 3.

The resource use information 170 is output to the power consumption controlling unit 180. According to an exemplary embodiment, the power consumption controlling unit 180 may be present in the form of a driver capable of driving or controlling the GPU 110. That is, a power management policy may be determined by processing the resource use information 170 at a driver stage driven in a host. In FIG. 1, the power consumption controlling unit 180 is illustrated as being present outside the GPU 110, but the power consumption controlling unit 180 may be present inside the GPU 110. That is, the power consumption controlling unit 180 may be present on a power management module included in the GPU 110.

The power consumption controlling unit 180 determines a power consumption level of a resource based on the determination result of the code characteristic extracting unit 165. That is, the power consumption control apparatus 180 determines a power consumption level of a resource selected by the resource selecting unit 163 by using the resource use information 170, and control power consumption of the selected resource based on the determined power consumption level. The power consumption controlling unit 180 reduces a power consumption level of an unused resource among the resources selected by the resource selecting unit 163.

A method of controlling a power consumption level of a selected resource will be described below with reference to FIG. 3.

Figure 2:
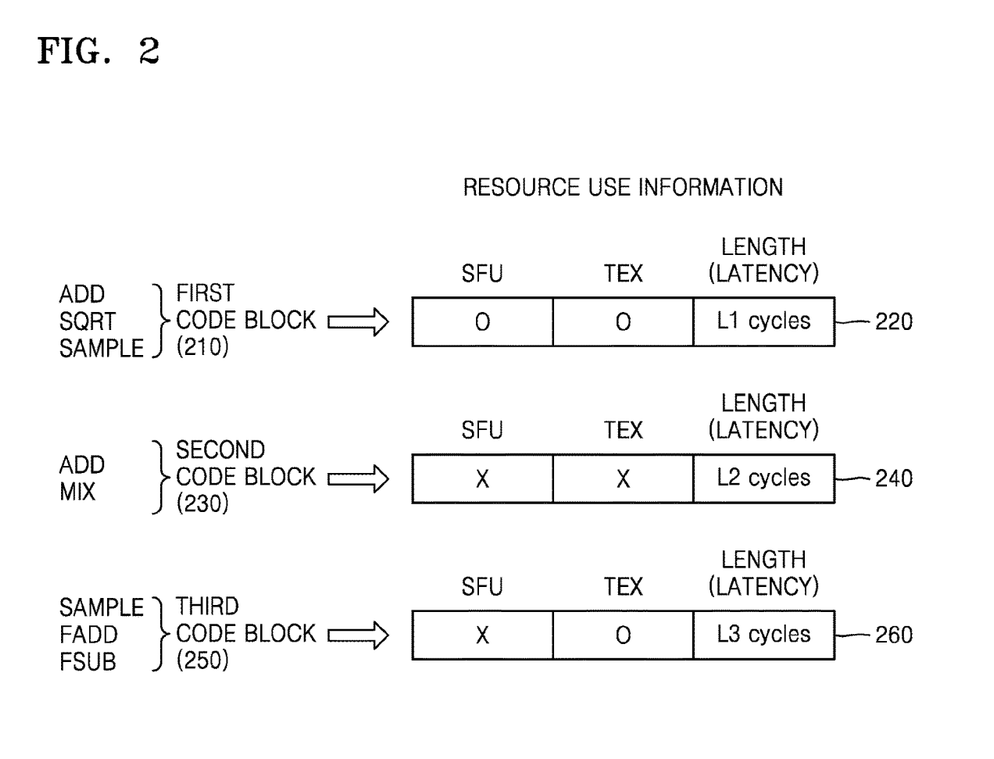
FIG. 2 is a diagram illustrating an example of a method of acquiring resource use information from a predetermined code block in a power consumption control apparatus.

FIG. 2 is a diagram illustrating an example of a method of acquiring resource use information from a predetermined code block in the power consumption control apparatus.

As described above, the power consumption control apparatus 100 selects a predetermined resource having high importance or interest for reduction of power consumption. In addition, the power consumption control apparatus 100 selects resources with respect to the types of the resources, the number of the resources, and connection of the resources within the GPU. Furthermore, the power consumption control apparatus 100 may select resources by taking into consideration power consumption levels of the resources within the GPU and a time necessary for changing the power consumption levels.

The power consumption control apparatus 100 extracts a command included in the code block and records, in the resource use information, whether the code block uses a relevant resource.

For convenience of description, it is assumed that the power consumption control apparatus 100 extracts a code characteristic from the code block and records, in the resource use information, whether the SFU and the texture unit are used, so as to determine power consumption levels of the SFU and the texture unit included in the GPU. The code characteristic extraction described with reference to FIG. 2 is performed in the code characteristic extracting unit 160 of the power consumption control apparatus 100, but is not limited thereto.

According to an exemplary embodiment, the power consumption control apparatus 100 acquires first resource use information 220, second resource use information 240, and third resource use information 260, in which whether the GPU uses the SFU and the texture unit when processing a first code block 210, a second code block 230, and a third code block 250 is recorded.

The power consumption control apparatus 100 confirms that the first code block 210 includes an ADD command, an SQRT command, and a SAMPLE command and determines that the ADD command, the SQRT command, and the SAMPLE command use the ALU, the SFU, and the texture unit, respectively. As described above, since the power consumption control apparatus 100 is capable of acquiring the resource use information of the selected resource, whether the SFU and the texture unit are used to process the first code block 210 may be recorded in the resource use information 220.

According to an exemplary embodiment, the power consumption control apparatus 100 records a length of the first code block 210 in the first resource use information 220. The length of the code block may be a value expressing a latency necessary for processing the code block in the GPU by a cycle. The length of the code block may be variable according to a compiling result, a GPU structure, and a user definition.

According to an exemplary embodiment, the power consumption control apparatus 100 records, in the first resource use information 220, information indicating that an L1 cycle is necessary when the GPU processes the first code block 210. The length of the code block may be used as a reference for determining whether to reduce a power consumption level of a predetermined resource, which will be described below with reference to FIGS. 3 and 4.

According to an exemplary embodiment, the power consumption control apparatus 100 may confirm that the second code block 230 includes an ADD command a MIX command and record, in the second resource use information 240, information indicating that the ADD command and the MIX command do not use the SFU and the texture unit.

According to an exemplary embodiment, the power consumption control apparatus 100 includes information in the second resource use information 240 indicating that an L2 cycle may be necessary when the GPU processes the second code block 210.

According to an exemplary embodiment, the power consumption control apparatus 100 may confirm that the third code block 250 includes a SAMPLE command, a FADD command, and an FSUB command and record information indicating that the SAMPLE command, the FADD command, and the FSUB command use the SFU but do not use the texture unit. According to an exemplary embodiment, the power consumption control apparatus 100 may record, in the third resource use information 260, information indicating that an L3 cycle may be necessary when the GPU processes the third code block 250.

According to an exemplary embodiment, when recording the use or non-use of the selected resource in the resource use information 220, 240, and 260, the power consumption control apparatus 100 may generate a field for each resource and express the use or non-use of the resource with a flag within the generated field. For example, if the resource use information is acquired corresponding to a code block that is used by the SFU but is used by the texture unit, a field value of an SFU may be expressed as "1" and a field value of a texture unit may be expressed as "0". The resource use information may have a text form but is not limited thereto. For example, the resource use information may have a structure form, a file form, or a message form.

Figure 3:
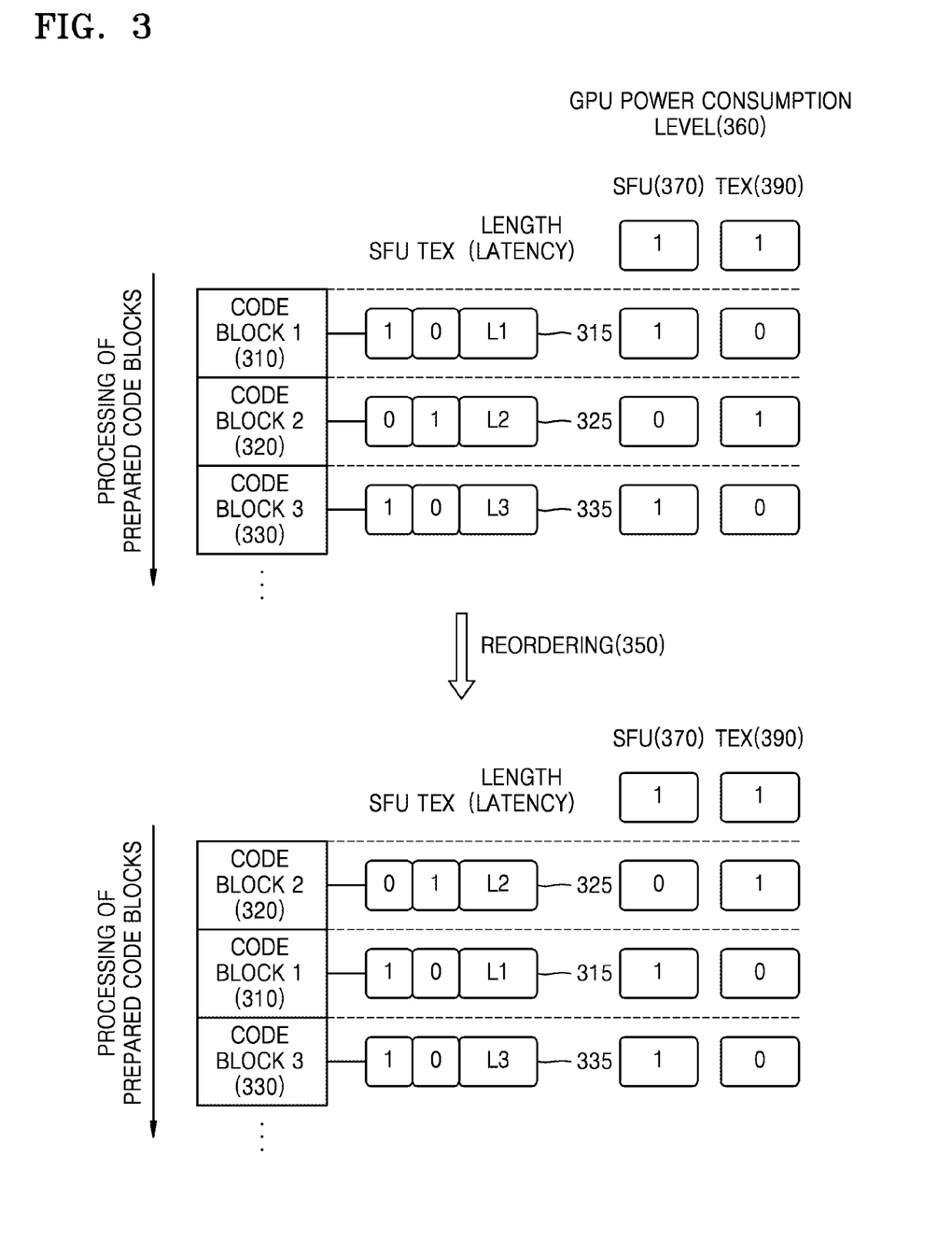
FIG. 3 is a diagram illustrating an example of a method of controlling power consumption levels of GPU resources and a method of reordering a code block processing sequence in a power consumption control apparatus.

FIG. 3 is a diagram of a method of controlling power consumption levels of GPU resources and a method of reordering a code block processing sequence in the power consumption control apparatus.

In order to use a specific resource of a GPU, the corresponding resource consumes a high power level, but an unused resource is capable of operating with power having a low power level. Therefore, the power consumption control apparatus 100 according to the exemplary embodiment may reduce a power consumption level of an unused resource.

Hereinafter, the high power level may correspond to a sufficiently high power level that does not exceed a power which a predetermined resource can maximally receive but must be consumed so as to use the resource. If power currently consumed in the resource is lower than a necessary level, the power consumption control apparatus 100 may increase the power consumption level of the corresponding resource.

On the other hand, the low power level may correspond to a minimum power level or a sufficiently low power level that is consumed by a resource because the corresponding resource is not used or is used at a very low frequency. If power currently consumed in the resource is higher than the low power level, the power consumption control apparatus 100 may reduce the power consumption level of the corresponding resource.

A power consumption control method described with reference to FIG. 3 may be performed in the power consumption controlling unit 180 of the power consumption control apparatus 100, but is not limited thereto.

For convenience of description, it is assumed that the GPU 110 sequentially processes a first code block 310, a second code block 320, and a third code block 330. In addition, it is assumed that, in order to control the power consumption levels of the SFU and the texture unit, the power consumption control apparatus 100 records, in resource use information 315, 325, and 335, information indicating whether the cord blocks use the SFU and the texture unit, respectively. The resource use information 315, 325, and 335 may include a length (that is, latency) necessary when the code blocks 310, 320, and 330 are processed in the GPU.

According to an exemplary embodiment, before the first code block 310 processed at the first time is input to the GPU, the power consumption control apparatus 100 may establish a power management policy by previously reading resource use information corresponding to the code block, determining whether the SFU 125 and the texture unit are to be used, and determining the power consumption levels of the SFU 370 and the texture unit 390 when the code blocks are processed.

According to an exemplary embodiment, the resource use information 315, 325, and 335 may express the use of the corresponding resource as "1" and the non-use of the corresponding resource as "0" with respect to the SFU and the texture unit. In addition, in the GPU power consumption levels 360, "1" indicates that the corresponding resources consumes a high power level and "0" indicates that the corresponding resource consumes a low power level.

Before the first code block 310 is input to the GPU, the power consumption levels 360 of the SFU 370 and the texture unit 390 are all "1", and thus, the high power level is consumed. The power consumption control apparatus 100 may read the first resource use information 315 corresponding to the first code block 310 and determine whether the SFU 370 and the texture unit 390 are used when the first code block 310 is processed.

In the first user information 315 of the first code block 315, since the field value of the SFU 370 is 1 and the field value of the texture unit 390 is 0, it may be determined that when the GPU 110 processes the first code block 310, the SFU 370 is used but the texture unit 390 is not used. Therefore, the power consumption control apparatus 100 may maintain the power consumption level of the SFU 380 as it is and change the power consumption level of the texture unit 390 to the low power level.

In the second use information 325 of the second code block 320, the field value of the SFU 370 is 0 and the field value of the texture unit 390 is 1. Therefore, the power consumption control apparatus 100 may change the power consumption level of the SFU 370 to the low power level and change the power consumption level of the texture unit 390 again to the high power level.

According to an exemplary embodiment, the power consumption control apparatus 100 may change the power consumption level of the SFU 370 to the low power level when the length of the second code block 320 is greater than a predetermined threshold value. A time is required when the power consumption control apparatus 100 changes the power consumption level, and a load occurs in the change of the power consumption level itself. Therefore, it may be determined that when the length of the code block is greater than the predetermined threshold value, it is advantageous to reduce the power consumption level of the corresponding resource during the length (that is, latency) of the code block. That is, the power consumption control apparatus 100 may determine whether the length L2 recorded in the second resource use information 325 is greater than the threshold value.

In the third use information 335 of the third code block 330, the field value of the SFU 370 is 1 and the field value of the texture unit 390 is 0. Therefore, the power consumption control apparatus 100 may change the power consumption level of the SFU 370 to the high power level and change the power consumption level of the texture unit 390 again to the low power level. According to an exemplary embodiment, the power consumption control apparatus 100 may change the power consumption level of the SFU 370 to the low power level when the length L3 of the third code block 330 is greater than the predetermined threshold value.

According to an exemplary embodiment, the power consumption control apparatus 100 may perform reordering 350 on the sequence of the code blocks 310, 320, and 330 to be processed in the GPU 110. That is, the processing sequence of code blocks allocated to a single processing element may be changed. This is because the code blocks allocated to the processing element have no dependency therebetween, the sequence of the first code block 310->the second code block 320->the third code block 330 may be reordered to the sequence of the second code block 320->the first code block 310->the third code block 330 before processing.

According to an exemplary embodiment, the power consumption control apparatus 100 may perform reordering 350 on the processing sequence so as to reduce the sum of changes in the power consumption levels of a predetermined resource while processing a plurality of code blocks. Since changing the power consumption level of the resource in the power consumption control apparatus 100 requires time and causes a load, the power consumption control apparatus 100 may perform reordering 350 on the processing sequence of the code blocks so as to minimize the sum of the changes in the power consumption levels of the resource. Since the power consumption control apparatus 100 is capable of maintaining the low power level by performing reordering 350 on the processing sequence of the plurality of code blocks, it is possible to efficiently manage the power consumption.

According to an exemplary embodiment, the power consumption control apparatus 100 may perform reordering 350 on the processing sequence of the code blocks so as to minimize the change in the power consumption level occurring during the processing of the plurality of code blocks, based on the single resource having high priority or interest for the reduction of power consumption.

According to an exemplary embodiment, the power consumption control apparatus 100 may minimize the change in the power consumption level of the texture unit 390 by reordering the processing sequence of the blocks. For example, as illustrated in FIG. 3, the processing sequence includes the second code block 320, the first code block 310, and the third code block 330 instead of the first code block 310, the second code block 320, and the third code block 330.

According to an exemplary embodiment, the power consumption control apparatus 100 may reference the resource use information 310, 320, and 330 so as to reorder the processing sequence of the plurality of code blocks. For example, the power consumption control apparatus 100 may calculate a change amount of a bit value of a referenced field with reference to the texture unit fields of the resource use information 310, 320, and 330. That is, when the power consumption control apparatus 100 processes the first code block 310, the second code block 320, and the third code block 330 in this order, the change in the bit values of the texture unit fields of the resource use information 310, 320, and 330 occurs twice (from 0 to 1 and from 1 to 0). However, when the power consumption control apparatus 100 processes the second code block 320, the first code block 310, and third code block 330 in this order, the change in the bit values of the texture unit fields of the resource use information 310, 320, and 330 occurs once. Since the power consumption control apparatus 100 is capable of maintaining the low power level during an (L1+L3) cycle (the sum of the length of the first code block and the length of the third code block) by reordering the processing sequence, it is possible to efficiently manage the power consumption.

According to an exemplary embodiment, the power consumption control apparatus 100 may reorder the processing sequence of a plurality of code blocks, based on a plurality of resources instead of a single resource. For example, the power consumption control apparatus 100 may reorder the processing sequence so as to minimize a total number of times of change in the bit value, based on a plurality of resource field values included in the resource use information.

The reordering 350 according to the exemplary embodiment may be performed by the processing sequence reordering unit 175 of FIG. 1, but is not limited thereto. The power consumption control apparatus 100 may perform the reordering 250 periodically (for example, every 5 ns) or upon the occurrence of a predetermined event, but is not limited thereto.

Figure 4:
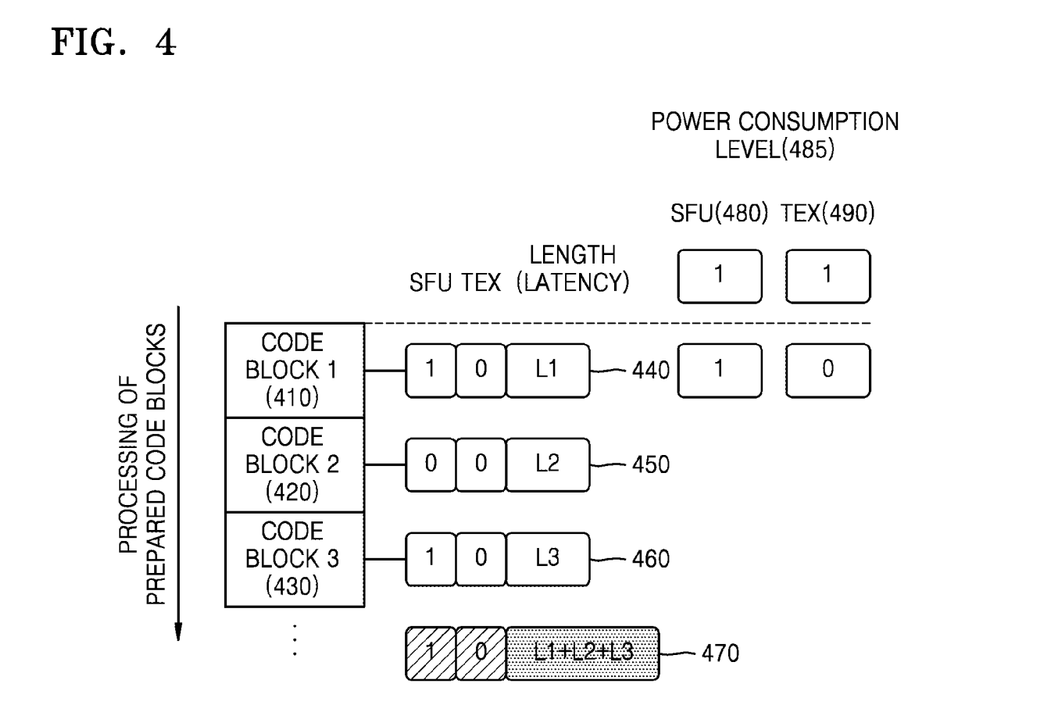
FIG. 4 is a diagram illustrating an example of a process of acquiring single resource use information by merging a plurality of resource use information in a power consumption control apparatus.

FIG. 4 is a diagram illustrating an example of a process of acquiring single resource use information by merging a plurality of resource use information in the power consumption control apparatus.

According to an exemplary embodiment, the power consumption control apparatus 100 may acquire single resource use information 470 by merging a plurality of resource use information 440, 450, and 460. The resource use information 470 is acquired by merging resource use the information 440, 450, and 460 of the first code block 410, the second code block 420, and the third code block 430. According to an exemplary embodiment, the power consumption control apparatus 100 may merge the resource use information 440, 450, and 460 of the successive code blocks 410, 420, and 430, based on the resources having the same format of the resource use information. Alternatively, according to an exemplary embodiment, the power consumption control apparatus 100 may merge resource use information of a preset number of code blocks.

According to an exemplary embodiment, when a field value of a predetermined resource in the resource use information has a bit format, the power consumption control apparatus 100 may merge the plurality of resource use information 440, 450, and 460 by applying a bitwise operation thereto. For example, the power consumption control apparatus 100 may merge the plurality of resource use information 440, 450, and 460 by applying an OR operation thereto.

That is, when one or more of the plurality of code blocks uses a predetermined resource, the power consumption control apparatus 100 may determine that all the code blocks use the predetermined resource, and when all the code blocks do not use the predetermined resource, the power consumption control apparatus 100 may determine that all the code blocks do not use the predetermined resource and merge the resource use information 440, 450, and 460.

In other words, the power consumption control apparatus 100 may acquire the resource use information 470 generated by merging the resource use information 440, 450, and 460 of the code blocks 410, 420, and 430 and record a length of the plurality of code blocks by summing lengths of the first to third code blocks 410, 420, and 430 in the resource use information 470. According to an exemplary embodiment, the power consumption control apparatus 100 may acquire the resource use information 470, of which the bit value of the SFU field is 1, the bit value of the texture unit field is 0, and the sum of the lengths of the code blocks is L1+L2+L3, by performing an OR operation on the bit values 1, 0, and 1 of the SFU fields and performing an OR operation on the bit values 0, 0, and 0 of the texture unit fields.

That is, the power consumption control apparatus 100 may reduce the power consumption level of the resource that is not used while the GPU processes the first code block 410, the second code block 420, and the third code block 430. At this time, the power consumption control apparatus 100 according to the exemplary embodiment reduces the power consumption level when the sum (L1+L2+L3) of the lengths of the code blocks is equal to or greater than the threshold value improving the efficiency of the power consumption policy. When the power consumption levels of the first to third code blocks 410, 420, and 430 are determined using the merged resource use information 470, the power consumption control apparatus 100 may read resource use information of a next code block, whose power consumption level is not yet determined. That is, since the power consumption levels of the first to third code blocks 410, 420, and 430 have already been determined using the merged resource use information 470, the power consumption control apparatus 100 may skip the second code block 420 and the third code block 430 and read resource use information of a code block to be processed after the third code block 430.

The power consumption control apparatus 100 determines a power consumption level of a predetermined resource based on the merged resource use information 470 and controls a power consumption level of a predetermined resource while the GPU processes a plurality of code blocks 410, 420, and 430 based on the determined power consumption level.

Although not illustrated, according to an exemplary embodiment, a single resource in the power consumption control apparatus 100 may be shared by two or more different processing elements. For example, a first processing element and a second processing element may share a single texture unit. The GPU may allocate a code block A, a code block B, and a code block C to the first processing element and process the code block A, the code block B, and the code block C, and may allocate a code block X and a code block Y to the second processing element and process the code block X and the code block Y.

To control the power consumption level of the texture unit shared by the first processing element and the second processing element, the power consumption control apparatus 100 acquires first resource use information of the code blocks A, B, and C by merging the resource use information of the code blocks A, B, and C. The power consumption control apparatus 100 further acquires second resource use information of the code blocks X and Y by merging the resource use information of the code blocks X and Y, and merges the first resource use information and the second resource use information. In this manner, the power consumption control apparatus 100 acquires single resource use information of the texture unit.

When a value between the sum of the lengths of the code blocks A, B, and C and the sum of the lengths of the code blocks X and Y is greater than a predetermined threshold value, the power consumption control apparatus 100 determines that it is advantageous to change the power consumption level of the texture unit to a low power level.

Figure 5:
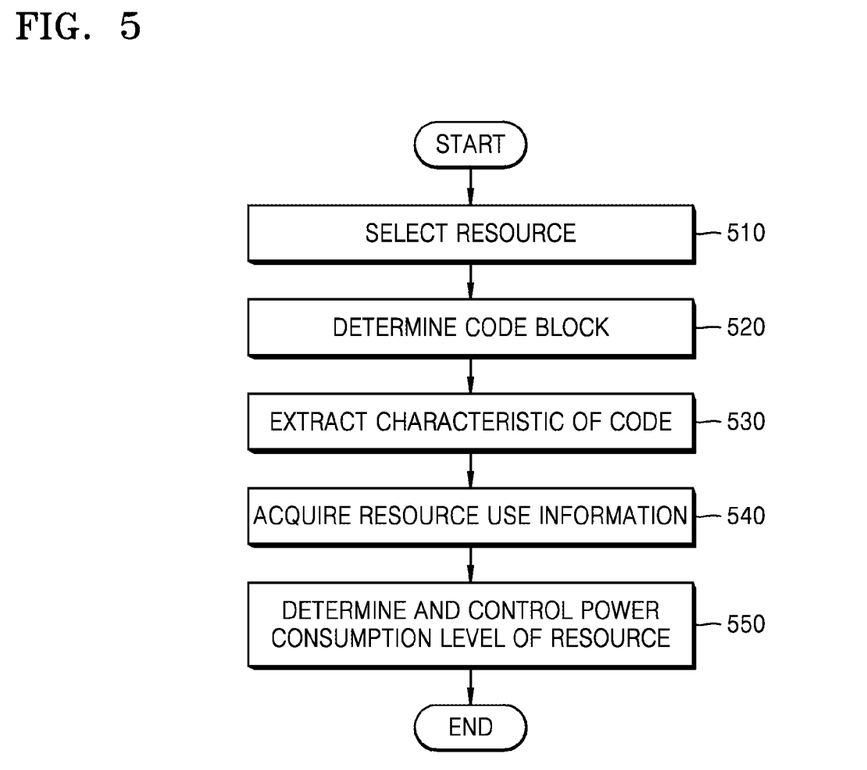
FIG. 5 is a flowchart illustrating an example of a method of controlling power consumption levels of GPU resources in a power consumption control apparatus.

FIG. 5 is a flowchart illustrating an example of a method of controlling power consumption levels of GPU resources in the power consumption control apparatus.

Specifically, FIG. 5 is a flowchart of a power consumption control method that is performed by the power consumption control apparatus 100 illustrated in FIGS. 1 to 4. Therefore, although omitted herein, the contents, which have been described about the power consumption control apparatus 100, may also be applied to the power consumption control method of FIG. 5.

In operation 510, the resource selecting unit 100 selects a predetermined resource having high importance or interest for reduction of power consumption among GPU resources.

In operation 520, the power consumption control apparatus 100 determines a predetermined code block from a program that uses the GPU. The program corresponds to a set of commands that are expressed with a series of methods and sequences performed using the GPU. The program includes applications for rendering a 3D graphic by using the GPU, such as a game or a CAD program using a 3D display.

The code block corresponds to all or part of the program. The code block includes a high level programming language, such as C language and Java, or a low level programming language, such as a machine language, but is not limited thereto.

The code block includes a machine language obtained by compiling a high level programming language. In addition, the code block is a function constituting the program, a file constituting the program, and one or more code lines, but is not limited thereto. It is obvious that a single program includes one or more code blocks.

In operation 530, the power consumption control apparatus 100 extracts a characteristic of a code included in the code block. The characteristic of the code corresponds to information capable of being acquired from the code included in the code block and information referenced when determining a power consumption level of the resource selected in operation 510. The characteristic of the code includes a type of a command, a type of data, a use frequency of a command, and meta information of a code, but is not limited thereto.

In operation 530, the power consumption control apparatus 100 determines whether a SAMPLE command is included in the code block, and when it is determined that the SAMPLE command is included in the code block, the power consumption control apparatus 100 expects that the GPU will process the code block by using the texture unit. Alternatively, when it is determined that the SAMPLE command is not included in the code block, the power consumption control apparatus 100 expects that the GPU will not use the texture unit when processing the code block.

In operation 540, the power consumption control apparatus 100 acquires resource use information capable of determining the power consumption level of the resource selected in operation 510, based on the characteristic extracted from the code block.

The power consumption control apparatus 100 provides information, in the resource use information, indicating whether the code block uses the resource selected in operation 510.

The resource use information acquired in operation 510 may be merged with a plurality of code blocks, or the power consumption control apparatus 100 changes the processing sequence of the plurality of code blocks so as to reduce the sum of the changes in the power consumption level of the predetermined resource, based on the acquired one or more pieces of the resource use information.

In operation 550, the power consumption control apparatus 100 reads the resource use information, determines the power consumption level of the resource selected in operation 510, and controls the power consumption level of the selected resource based on the determined power consumption level.

Although operations 510, 520, and 530 are illustrated as a sequential flow, the power consumption control apparatus 100 may perform operation 510 after operations 520 and 530, or may perform operations 520 and 530 at the same time as operation 510, but is not limited thereto.

Figure 6:
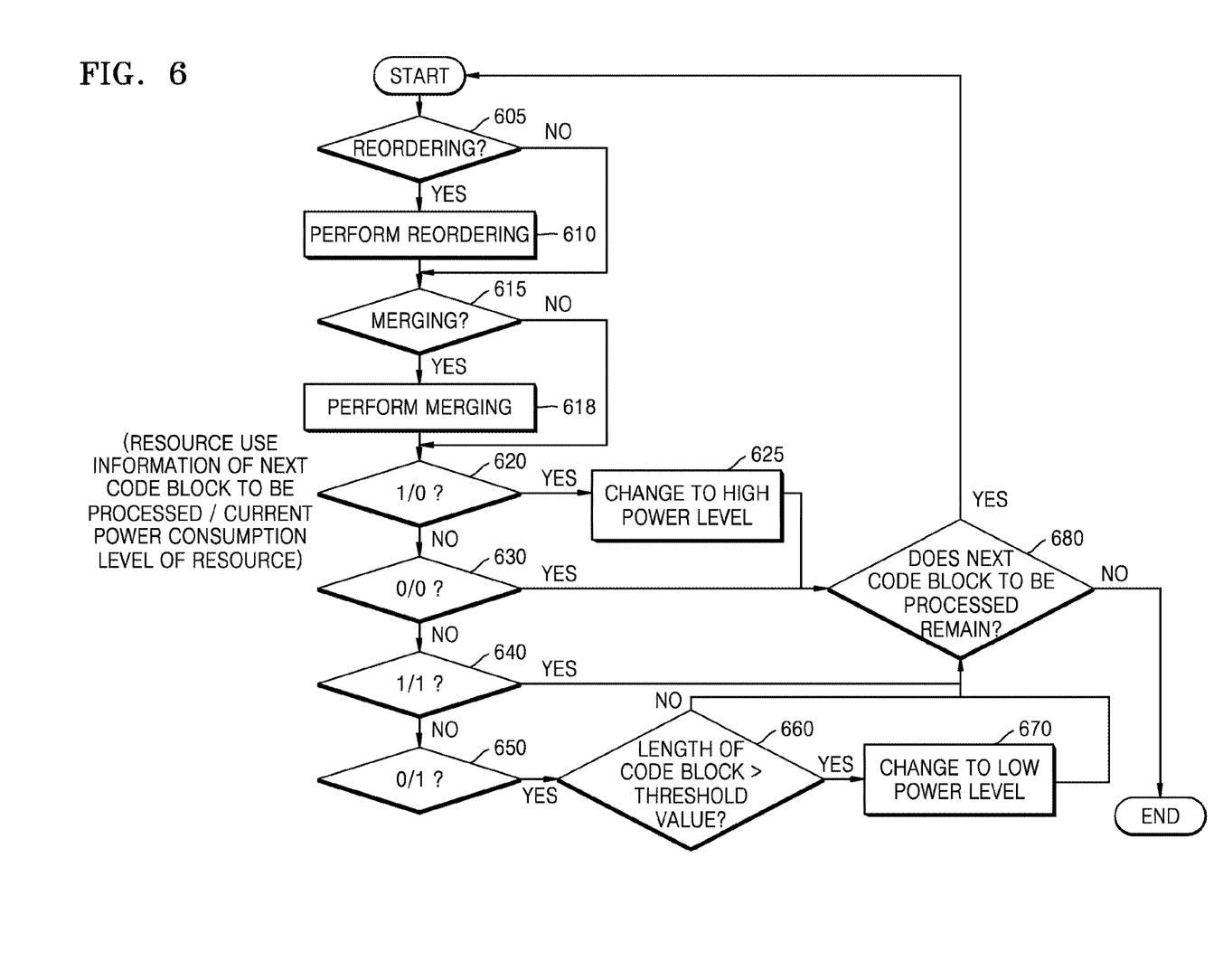
FIG. 6 is a flowchart illustrating an example of a method of controlling power consumption levels of GPU resources in a power consumption control apparatus.

FIG. 6 is a flowchart illustrating an example of a method of controlling power consumption levels of GPU resources in a power consumption control apparatus.

FIG. 6 is a flowchart of a power consumption control method that is performed by the power consumption control apparatus 100 illustrated in FIG. 3. Therefore, although omitted herein, the contents, which have been described about the power consumption control apparatus 100 of FIG. 3, may also be applied to the flowchart of FIG. 6.

In operation 605, the power consumption control apparatus 100 determines whether it is necessary to reorder the processing sequence of the plurality of code blocks to be processed in the GPU. The power consumption control apparatus 100 reorders the processing sequence so as to reduce the sum of changes in the power consumption levels of a predetermined resource while processing the plurality of code blocks. Since changing the power consumption level of the resource requires time and causes a load, the power consumption control apparatus 100 reorders the processing sequence of the code blocks so as to minimize the sum of the changes in the power consumption levels of the resource.

In operation 610, the power consumption control apparatus 100 reorders the processing sequence of the code blocks so as to minimize the change in the power consumption level occurring during the processing of the plurality of code blocks, based on the single resource having high importance or interest for reduction of power consumption.

In operations 615 and 618, the power consumption control apparatus 100 determines whether it is necessary to merge resource use information of the plurality of code blocks and perform merging thereof. In operation 618, in a case where a field value of a predetermined resource in the resource use information has a bit format, the power consumption control apparatus 100 merges the plurality of resource use information by applying a bitwise operation thereto. For example, the power consumption control apparatus 100 merges the plurality of resource use information by applying an OR operation thereto.

In operations 620, 630, 640, and 650, the power consumption control apparatus 100 reads resource use information of a next code block to be processed and determines whether the next code block to be processed uses the corresponding resource. In operations 620, 630, 640, and 650, a number on the left of a symbol "/" refers to resource use information of the next code block to be processed, and a number on the right of the symbol "/" refers to a current resource power consumption state. In addition, when the number on the left of the symbol "/" is "1", it indicates that the next code block to be processed uses the corresponding resource, and when "0", it indicates that the next code block to be processed does not use the corresponding resource. When the number on the right of the symbol "/" is "1", it indicates that the current power consumption level of the resource is a high power level, and when "0", it indicates that the current power consumption level of the resource is a low power level.

When it is determined in operations 620 and 630 that the current power consumption level of the predetermined resource is a low power level and the next code block to be processed will use the corresponding resource, the power consumption control apparatus 100 may proceed to operation 625 to change the power consumption level of the corresponding resource to a high power level. Alternatively, when it is determined that the next code block to be processed will not use the corresponding resource, the power consumption control apparatus maintains the current power consumption level and immediately proceeds to operation 680 to determine whether a code block to be processed remains.

When it is determined in operations 640 and 650 that the current power consumption level of the predetermined resource is a high power level and the next code block to be processed will use the corresponding resource, the power consumption control apparatus 100 maintains the current power consumption level and immediately proceeds to operation 680 to determine whether a code block to be processed remains. Alternatively, when it is determined that the next code block to be processed will not use the corresponding resource, the power consumption control apparatus 100 proceeds to operation 680.

In operation 660, the power consumption control apparatus 100 determines whether the length of the code block to be processed is greater than a predetermined threshold value. A time is required when the power consumption control apparatus 100 changes the supplied power level, and a load occurs in the change of the power level itself. Therefore, it is determined that when the length of the code block is greater than the predetermined threshold value, it is advantageous to reduce the power level supplied to the corresponding resource during the length (that is, latency) of the code block. When the condition of operation 660 is satisfied, the power consumption control apparatus 100 proceeds to operation 670 to change the power consumption level to a low power level and proceeds to operation 680 to determine whether a code block to be processed remains. Alternatively, when the condition of operation 660 is not satisfied, it is determined that it is not advantageous even when the consumption control apparatus 100 changes the power consumption level to the low power level. Therefore, the power consumption control apparatus does not change the power consumption level and proceeds to operation 680 to determine whether a code block to be processed remains.

In addition, other exemplary embodiments can also be implemented through computer readable code/instructions in/on a medium, e.g., a computer readable medium, to control at least one processing element to implement any above described exemplary embodiment. The medium can correspond to any medium/media permitting the storage and/or transmission of the computer readable code.

The computer readable code can be recorded/transferred on a medium in a variety of ways, with examples of the medium including recording media, such as magnetic storage media (e.g., ROM, floppy disks, hard disks, etc.) and optical recording media (e.g., CD-ROMs, or DVDs), and transmission media such as Internet transmission media. Thus, the medium may be such a defined and measurable structure including or carrying a signal or information, such as a device carrying a bitstream according to one or more exemplary embodiments. The media may also be a distributed network, so that the computer readable code is stored/transferred and executed in a distributed fashion. Furthermore, the processing element could include a processor or a computer processor, and processing elements may be distributed and/or included in a single device.

The methods, processes, apparatuses, products, and/or systems according to the exemplary embodiments are simple, cost-effective, uncomplicated, various, and accurate. In addition, immediately available, efficient and economic manufactures, applications, and utilizations may be implemented by applying known elements to the processes, apparatuses, products, and/or systems according to the exemplary embodiments. Another important aspect of the exemplary embodiment is to meet the current tendency requiring cost reduction, system simplification, and performance improvement. Such useful aspects of the exemplary embodiments are expected to increase at least the current technological level.

It should be understood that the exemplary embodiments described therein should be considered in a descriptive sense only and not for purposes of limitation. Descriptions of features or aspects within each exemplary embodiment should typically be considered as available for other similar features or aspects in other exemplary embodiments.

While one or more exemplary embodiments have been described with reference to the figures, it will be understood by those of ordinary skill in the art that various changes in form and details may be made therein without departing from the spirit and scope as defined by the following claims.

What is claimed is:

1. A power consumption control apparatus comprising one or more processors, the one or more processors are configured to:
   select a resource from among a plurality of resources included in a graphics processing unit (GPU);
   generate a determination result indicating whether a code block of a program executed using the GPU uses the selected resource, the generating including,
      extracting a command included in the code block, and determining whether the extracted command is executed using the selected resource;
   determine a required power consumption level of the selected resource based on the determination result; and
   control a power consumption level of the selected resource based on the required power consumption level.

2. The power consumption control apparatus of claim 1, wherein the one or more processors are further configured to reduce the power consumption level of the selected resource while the GPU processes the code block upon the determination result indicating that the code block does not use the selected resource.

3. The power consumption control apparatus of claim 2, wherein the one or more processors are further configured to reduce the power consumption level when a time needed by the GPU to process the code block is greater than a threshold value.

4. The power consumption control apparatus of claim 1, wherein the one or more processors are further configured to
   generate additional determination results, each additional determination result indicating whether a respective code block of code blocks executed using the GPU uses the selected resource;
   generate a merging result by merging the determination result and the additional determination results;
   determine the required power consumption level of the selected resource based on the merging result; and
   control the power consumption level of the selected resource while the GPU processes the code blocks based on the required power consumption level.

5. The power consumption control apparatus of claim 4, wherein
   when the code block or at least one of the code blocks uses the selected resource, the merging result indicates that the selected resource is used, and
   when none of the code block or the code blocks uses the selected resource, the merging result indicates that the selected resource is not used.

6. The power consumption control apparatus of claim 5, wherein the one or more processor are further configured to reduce the power consumption level of the selected resource while the GPU processes the code blocks upon the merging result indicating that the selected resource is not used.

7. The power consumption control apparatus of claim 6, wherein the one or more processor are further configured to reduce the power consumption level when a time needed by the GPU to process the code blocks is greater than a threshold value.

8. The power consumption control apparatus of claim 1, wherein the one or more processor are further configured to,
   when the program comprises code blocks, reorder a processing sequence in which the GPU processes the code blocks
   such that a sum of changes in the power consumption level of the selected resource is reduced during execution of the code blocks,
   wherein the sum of the changes in the power consumption level of the selected resource is determined by comparing information about the use/non-use of the selected resource by each of the code blocks.

9. A power consumption control method comprising:
   selecting a resource from among a plurality of resources included in a graphics processing unit (GPU);
   generating a determination result indicating whether a code block of a program executed using the GPU uses the selected resource, the generating including,
      extracting a command included in the code block; and determining whether the extracted command is executed using the selected resource;
   determining a required power consumption level of the selected resource based on the determination result; and
   controlling a power consumption level of the selected resource based on the required power consumption level.

10. The power consumption control method of claim 9, wherein the controlling of the power consumption level comprises reducing the power consumption level of the selected resource while the GPU processes the code block upon the determination result indicating that the code block does not use the selected resource.

11. The power consumption control method of claim 10, wherein the controlling of the power consumption level comprises reducing the power consumption level of the selected resource when a time needed by the GPU to process the code block is greater than a threshold value.

12. The power consumption control method of claim 9, further comprising
   generating additional determination results, each additional determination result indicating whether a respective code block of code blocks executed by the GPU uses the selected resource,
   wherein the generating of the determination result further comprises generating a merging result by merging the determination result and the additional determination results, and
   the controlling of the power consumption level of the selected resource comprises determining the required power consumption level of the selected resource based on the merging result and controlling the power consumption level of the selected resource while the GPU processes the code blocks based on the required power consumption level.

13. The power consumption control method of claim 12, wherein
   when the code block or at least one of the code blocks uses the selected resource, the merging result indicates that the selected resource is used, and when none of the code block or the code blocks uses the selected resource, the merging result indicates that the selected resource is not used.

14. The power consumption control method of claim 13, wherein the controlling of the power consumption level comprises reducing the power consumption level of the selected resource while the GPU processes the code blocks upon the merging result indicating that the selected resource is not used.

15. The power consumption control method of claim 14, wherein the controlling of the power consumption level comprises reducing the power consumption level of the selected resource when a time needed by the GPU to processes the code blocks is greater than a threshold value.

16. The power consumption control method of claim 9, further comprising
when the program comprises code blocks, reordering a processing sequence in which the GPU processes the code blocks such that a sum of changes in the power consumption level of the selected resource is reduced during execution of the code blocks,
wherein the sum of the changes in the power consumption level of the selected resource is determined by comparing information about the use/non-use of the selected resource by each of the code blocks.

17. A non-transitory computer-readable recording medium having embodied thereon a program for executing the power consumption control method of claim 9.

18. A power consumption control method for a graphics processing unit (GPU), the method comprising:
selecting a resource having a high priority to reduce power consumption among a plurality resources included in a GPU;
determining a code block from an application that uses the GPU;
extracting a characteristic of a code included in the code block;
acquiring resource use information to determine a power consumption level of the selected resource based on the extracted characteristic of the code, the acquiring including determining whether the extracted characteristic of the code is executed using the selected resource;
determining the required power consumption level of the selected resource based on the acquired resource use information; and
controlling the power consumption level of the selected resource based on the required power consumption level.

* * * * *